US008659796B2

(12) United States Patent
Okada et al.

(10) Patent No.: US 8,659,796 B2
(45) Date of Patent: Feb. 25, 2014

(54) IMAGE FORMING APPARATUS AND IMAGE FORMING PROGRAM

(75) Inventors: Keiichi Okada, Saitama (JP); Mitsuru Iioka, Saitama (JP); Noribumi Sato, Saitama (JP); Jun Koyatsu, Saitama (JP); Kaoru Yamauchi, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 793 days.

(21) Appl. No.: 12/785,872

(22) Filed: May 24, 2010

(65) Prior Publication Data

US 2011/0102849 A1  May 5, 2011

(30) Foreign Application Priority Data

Nov. 2, 2009 (JP) ................................ 2009-252290

(51) Int. Cl.
*H04N 1/56* (2006.01)
*H04N 1/60* (2006.01)
*G06K 15/02* (2006.01)
*H04N 5/272* (2006.01)

(52) U.S. Cl.
USPC ............. 358/3.24; 358/1.6; 358/1.9; 358/2.1; 358/501; 358/505; 358/540; 358/401; 358/474; 399/51

(58) Field of Classification Search
USPC .......................................................... 399/51
See application file for complete search history.

(56) References Cited

U.S. PATENT DOCUMENTS

| | | | | |
|---|---|---|---|---|
| 6,331,901 | B1 * | 12/2001 | Fukuda et al. ................. | 358/1.2 |
| 7,375,862 | B2 * | 5/2008 | Tu ................................. | 358/474 |
| 7,903,281 | B2 * | 3/2011 | Encrenaz et al. ............. | 358/1.9 |
| 8,023,148 | B2 * | 9/2011 | Yoshida ......................... | 358/1.8 |
| 8,537,410 | B2 * | 9/2013 | Kobayashi .................... | 358/1.18 |
| 2004/0021311 | A1 * | 2/2004 | Shimada et al. ................ | 283/72 |
| 2004/0052401 | A1 * | 3/2004 | Suzaki .......................... | 382/100 |
| 2005/0041263 | A1 * | 2/2005 | Ishikawa et al. ............. | 358/1.14 |
| 2006/0256409 | A1 * | 11/2006 | Hiramatsu ..................... | 358/538 |
| 2007/0095235 | A1 * | 5/2007 | Nielsen et al. ................ | 101/483 |
| 2008/0008487 | A1 * | 1/2008 | Furuya .............................. | 399/51 |
| 2008/0037891 | A1 | 2/2008 | Koyatsu et al. | |
| 2008/0304696 | A1 * | 12/2008 | Eschbach et al. ............. | 382/100 |
| 2009/0086245 | A1 * | 4/2009 | Sugiyama .................... | 358/1.13 |
| 2009/0102873 | A1 * | 4/2009 | Hayashi ........................... | 347/8 |
| 2009/0116075 | A1 * | 5/2009 | Arai et al. ..................... | 358/3.28 |
| 2009/0315907 | A1 * | 12/2009 | Kobayashi .................... | 345/581 |
| 2010/0301119 | A1 * | 12/2010 | Maeda et al. ............. | 235/462.01 |

FOREIGN PATENT DOCUMENTS

| | | | | |
|---|---|---|---|---|
| JP | A-08-030063 | | 2/1996 | |
| JP | A-2004-069833 | | 4/2004 | |
| JP | 2006-174183 | * | 6/2006 | ............... H04N 1/00 |
| JP | 2007-257439 | * | 10/2007 | ............. G06K 19/06 |
| JP | A-2007-320089 | | 12/2007 | |
| JP | A-2009-193057 | | 8/2009 | |
| JP | A-2009-248531 | | 10/2009 | |

\* cited by examiner

OTHER PUBLICATIONS

Office Action dated Jul. 12, 2013 issued in Japanese Patent Application No. 2009-252290 (with translation).

*Primary Examiner* — King Poon
*Assistant Examiner* — Beniyam Menberu
(74) *Attorney, Agent, or Firm* — Oliff PLC

(57) ABSTRACT

An image forming apparatus includes: a ground image producing unit which produces a ground image that determines a print position of an information image; a ground image printing unit which prints the ground image produced by the ground image producing unit, with a printing color material which does not have a sensitivity in a reading wavelength of a reading apparatus that reads the information image; and an information image printing unit which prints the information image at a print position that is determined by the ground image printed by the ground image printing unit.

16 Claims, 9 Drawing Sheets

IMAGE FORMING APPARATUS AND IMAGE FORMING PROGRAM

CROSS-REFERENCE TO RELATED APPLICATIONS

This application is based on and claims priority under 35 USC 119 from Japanese Patent Application No. 2009-252290 filed on Nov. 2, 2009.

BACKGROUND

1. Technical Field

The present invention relates to an image forming apparatus and an image forming program.

2. Related Art

Because of the performance improvement of a printing apparatus due to the development of the information communication technology, a mark for the OMR (Optical Mark Recognition) which is indicated as code information is configured by a finer and more precise pattern. In printing of a mark for the OMR, therefore, a more accurate print quality is sometimes requested.

SUMMARY

According to an aspect of the invention, there is provided an image forming apparatus including: a ground image producing unit which produces a ground image that determines a print position of an information image; a ground image printing unit which prints the ground image produced by the ground image producing unit, by using a printing color material which does not have a sensitivity in a reading wavelength of a reading apparatus that reads the information image; and an information image printing unit which prints the information image at the print position that is determined by the ground image printed by the ground image printing unit.

BRIEF DESCRIPTION OF THE DRAWINGS

Exemplary embodiments of the present invention will be described in detail based on the following figures, wherein.

DESCRIPTION OF REFERENCE NUMERALS AND SIGNS

Figure 1:
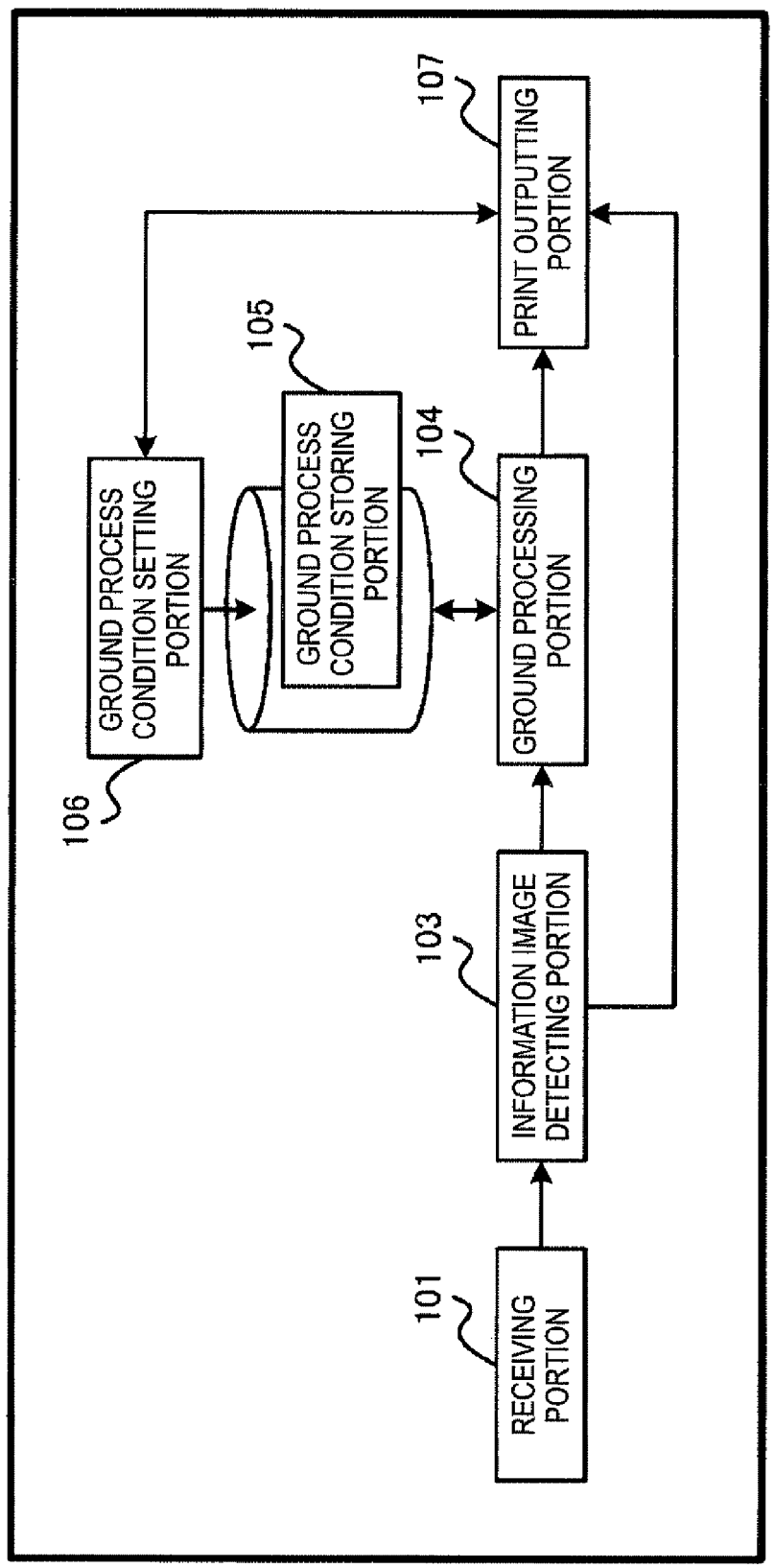
FIG. 1 is a diagram showing an example of the configuration of an image forming apparatus which is configured by applying an image forming apparatus and an image forming program of an exemplary embodiment of the invention.

101 receiving portion
103 information image detecting portion
104 ground processing portion
105 ground process condition storing portion
106 ground process condition setting portion
107 print outputting portion

DETAILED DESCRIPTION

Hereinafter, an exemplary embodiment of the image forming apparatus and image forming program of the invention will be described in detail with reference to the accompanying drawings.

FIG. 1 is a diagram showing an example of the configuration of an image forming apparatus which is configured by applying the image forming apparatus and the image forming program of the exemplary embodiment of the invention.

Referring to FIG. 1, the image forming apparatus is configured by a receiving portion 101, an information image detecting portion 103, a ground processing portion 104, a ground process condition storing portion 105, a ground process condition setting portion 106, and a print outputting portion 107.

The print outputting portion 107 print-outputs to-be-processed data which are instructed to be printed, to a print medium.

Figure 3:
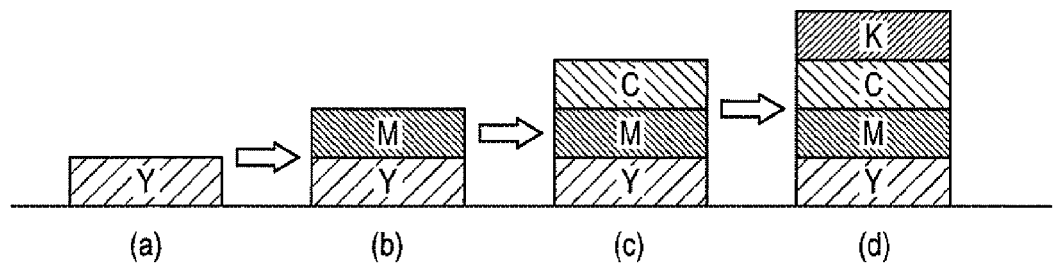
FIG. 3 is a view showing a form of superimposition printing of four printing color materials of CMYK.

In the print outputting portion 107, therefore, an exposing device exposes a photosensitive member (drum) of a charged image carrier to form a latent image based on the to-be-processed data, and four printing color materials of cyan (C), magenta (M), yellow (Y), and black (K) colors are superimposedly attached to the latent image in the sequence of yellow, magenta, cyan, and black colors as shown in FIG. 3. The photosensitive member to which the printing color materials are attached is rotated to move the printing color materials to a belt which is an intermediate transfer member, and the printing color materials on the intermediate transfer member are transferred to a print sheet which is a print medium, thereby performing a print output.

The receiving portion 101 is connected to an external information processing terminal through a communication line, and, when the portion receives to-be-processed data as a print request from the information processing terminal, receives print processing information together with the to-be-processed data, and then sends them to the information image detecting portion 103.

Figure 4A:
FIGS. 4A and 4B are views showing examples of code information.

The to-be-processed data sometimes contain an information image configured by code information such as a bar code or a two-dimensional bar code. FIG. 4A shows an example of the information image of a bar code, and FIG. 4B shows an example of the information image of a two-dimensional bar code.

The information image of the bar code shown in FIG. 4A indicates arbitrary information by means of a combination where a plurality of line images which are different in line width because of the configuration characteristic to the bar code are arranged at predetermined intervals. The information image of the two-dimensional bar code shown in FIG. 4B indicates arbitrary information by means of an arrangement where dot images (dots) are continuously arranged according to a predetermined rule.

In the receiving portion 101, a received to-be-printed image is stored into a storage portion (not shown) having a work area, and sent to the information image detecting portion 103.

Figure 4B:
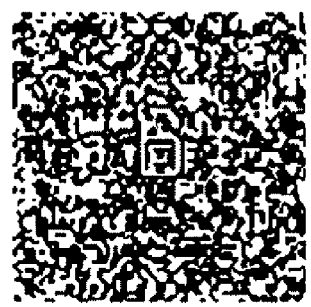

The information image detecting portion 103 performs a detecting process of detecting an information image configured by the above-described code information such as shown in FIG. 4A or 4B, on the received to-be-printed image.

When, in the detecting process, the information image is detected from the to-be-printed image, the kind of code information is identified from the detected information image, and the kind information of the identified kind is notified to the ground processing portion 104. By contrast, when, in the detecting process, the information image is not detected from the to-be-printed image, printing instructions are issued to the print outputting portion 107.

At this time, the print outputting portion 107 which is notified from the information image detecting portion 103 that the information image is not detected from the to-be-printed image reads out the to-be-printed image stored in the storage portion (not shown), and performs a print output.

The ground processing portion 104 which is notified of the kind information of the information image from the information image detecting portion 103 reads out ground process conditions (referred to also as "ground conditions") which are set for the kind information, from the ground process condition storing portion 105.

Figure 5:
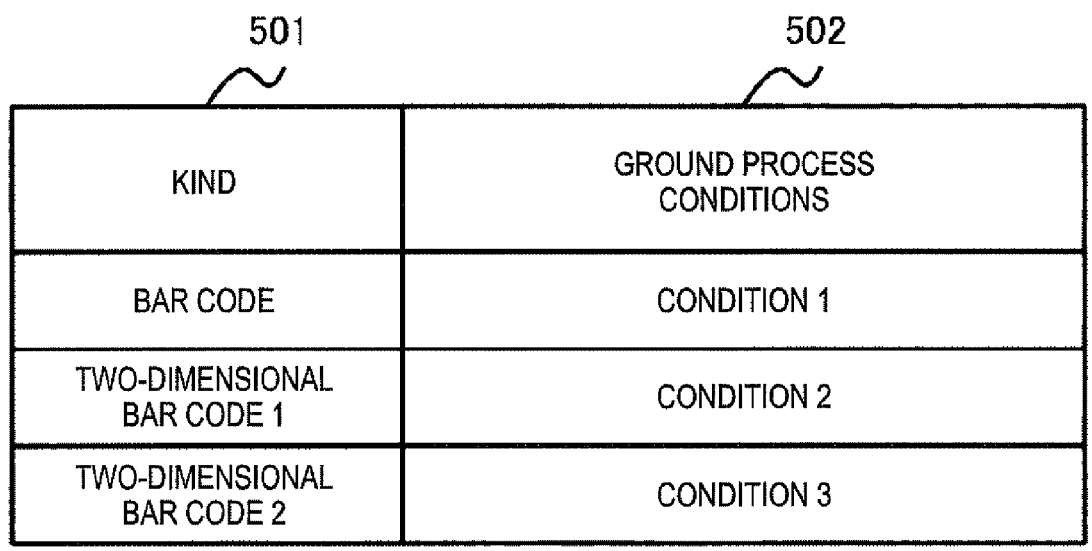
FIG. 5 is a view showing examples of ground process conditions.

The ground process condition storing portion 105 stores a condition management table such as shown in FIG. 5.

The condition management table shown in FIG. 5 is configured by [Kind] item 501 and [Ground process condition] item 502. In [Kind] item 501, a kind which is to be identified by the information image detecting portion 103 is designated, and, in [Ground process condition] item 502, ground process conditions which correspond to the kind designated in [Kind] item 501 are designated.

The ground process conditions are set for each kind by the ground process condition setting portion 106. In the ground process condition setting portion 106, the ground process conditions are set on the basis of set information which is set in the print output in the print outputting portion 107, such as the exposure amount, the charging potential, and the developing bias value, and configured by the amounts of the printing color materials (for example, toners) which are used in printing of the information image, the coverage, and the trapping amount.

The ground processing portion 104 reads out the ground process conditions which correspond to the kind of the information image detected by the information image detecting portion 103, from the condition management table such as shown in FIG. 5, and, based on the ground process conditions, performs a ground process on the information image contained in the to-be-printed image stored in the storage portion (not shown).

In the ground process, first, a ground image for identifying the print position where the line images (in the case of a bar code) or dot images (in the case of a two-dimensional code) constituting the information image is produced by using printing color materials other than those which can be read because of the provision of the sensitivity in the reading wavelength of a code reader that is a reading apparatus for reading arbitrary information from the information image.

When the ground processing portion 104 performs the ground process as described above to produce the ground image, the print outputting portion 107 prints the information image at the print position identified by the ground image which has undergone the ground process.

Figure 6:
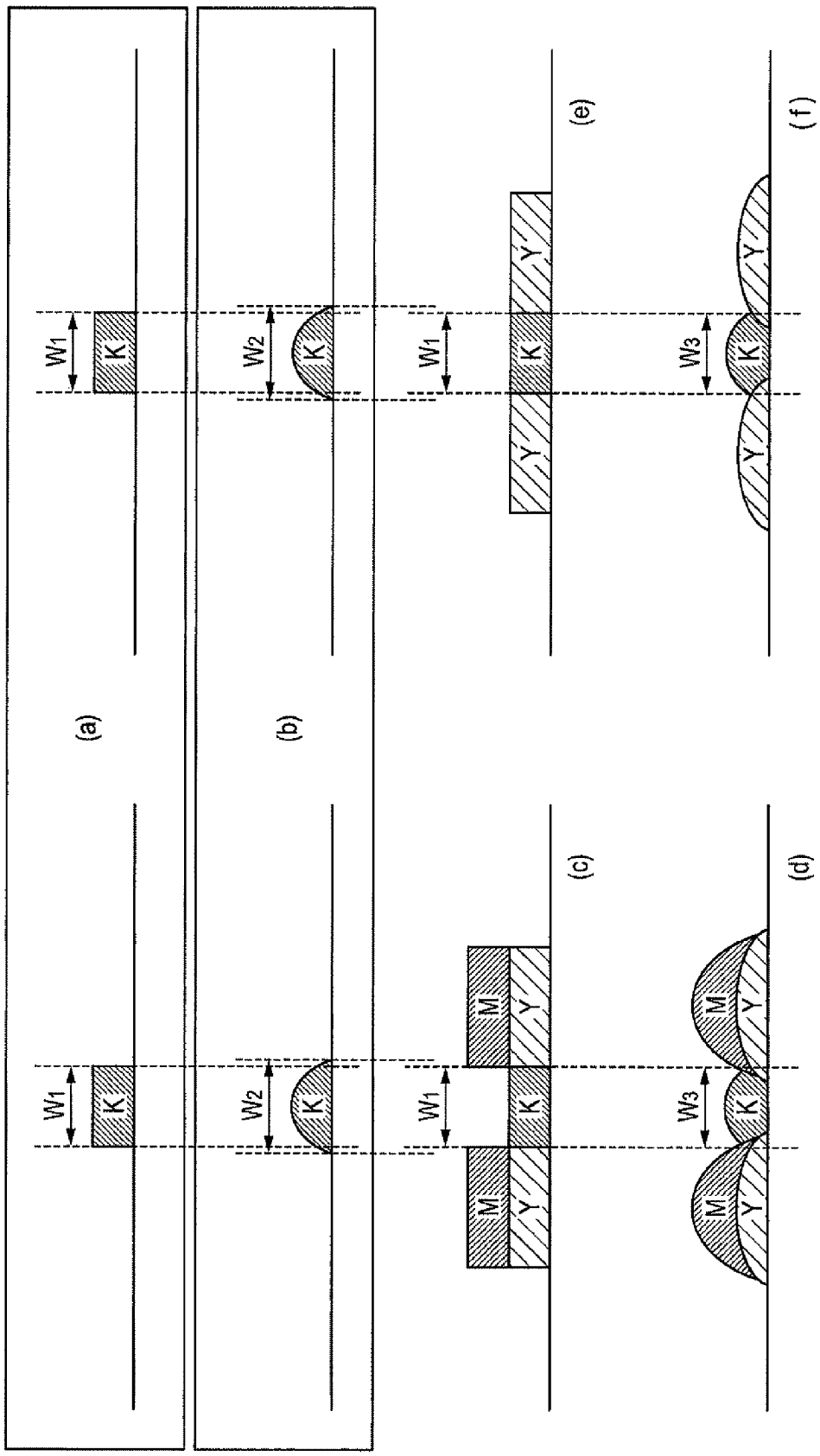
FIG. 6 is a view showing a ground process and the printing state of an information image.

FIG. 6 shows the printing state at this time.

In (a) of FIG. 6, a theoretical shape and dot width (W1) in the case where dot images (dots) are formed on a print sheet by a black printing color material are shown.

In (b) of FIG. 6, the shape and dot width (W2) of dot images (dots) which are actually printed on a print sheet are shown in contrast to the theoretical dot images shown in (a) of FIG. 6. The dot images shown in (b) of FIG. 6 are in a state where the dot width is larger than the theoretical one shown in (a) of FIG. 6 because of causes such as scattering of the printing color material and the dot gain.

In the ground process, therefore, the ground image for identifying the print position of the line images (in the case of the bar code) or the dot images (in the case of the two-dimensional code) constituting the information image is first produced by using printing color materials other than those for printing the information image, based on the ground conditions, thereby producing the ground such as shown in (c) of FIG. 6.

The width of the printing color materials for printing the information image is determined in accordance with the color material amount designated in the ground process conditions, the position where the printing color materials for the ground are to be printed is designated in the main- and sub-scanning directions in accordance with the coverage, and the kinds (the number of the color materials) of the printing color materials and the order of superimposition at that time are determined in accordance with the trapping amount.

In (c) of FIG. 6, because it is designated that "Yellow" and "Magenta" are printed in this sequence as the trapping amount in the ground process, "Yellow" is placed above the print sheet, and "Magenta" is placed above "Yellow", thereby printing a ground image tinged with red.

The figure shows an example in which, in this state, an information image is then printed by using the black color.

At this time, yellow and magenta printing color materials are those which, in the case where an information image is printed by using a black printing color material, cannot be read by a code reader that can read arbitrary information from the black printing color material. In the case where the code reader has the light source wavelength of "from 600 nm to 680 nm", for example, the ground is produced by using yellow and magenta colors which do not have a sensitivity in the light source wavelength.

The cyan color has a sensitivity in the light source wavelength, and hence is not used in the printing of the ground.

The ground shown in (c) of FIG. 6 has the theoretical shape and ground width (W1) in a similar manner shown in (a) of FIG. 6, and hence is actually in a state of a ground width (W3) which is larger than the theoretical ground width (W1), as shown in (d) of FIG. 6.

At this time, the black printing color material is printed after the printing of the printing color materials that function as the ground, and hence guided by walls formed by the ground printing color materials, so that the dot width which is the actual ground width (W3) is smaller than the theoretical ground width (W1).

Figure 7:
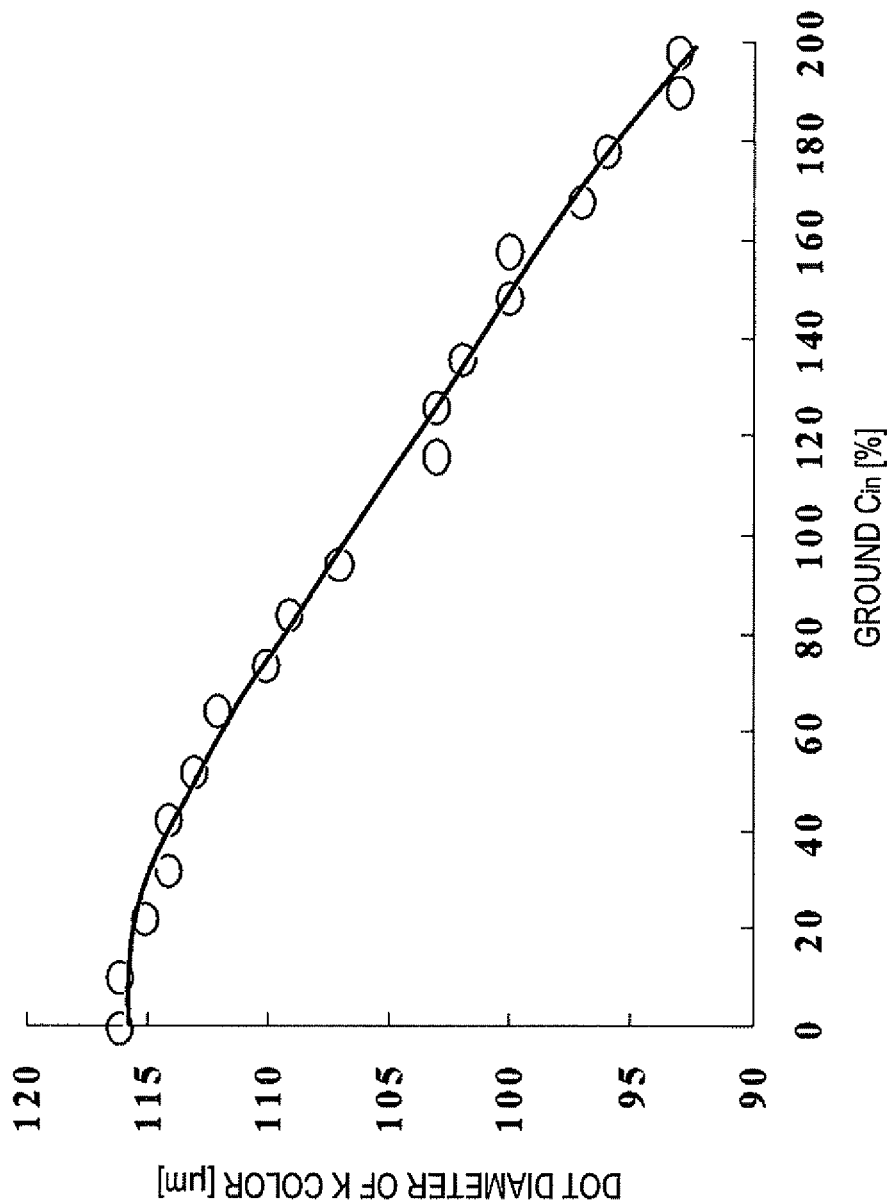
FIG. 7 is a view of a changing state of the diameter of a dot image according to a change of coverage.

This is apparent also from relationships shown in FIG. 7 between the dot width which is printed by using a printing color material for an information image, and the coverage which is ground-processed.

FIG. 7 shows a graph in which the ordinate indicates the dot width of the printing color material for the information image, and the abscissa indicates the ground-processed coverage, and which indicates that, as the rate of the coverage is larger, the dot width of the printing color material is smaller.

Figure 8:
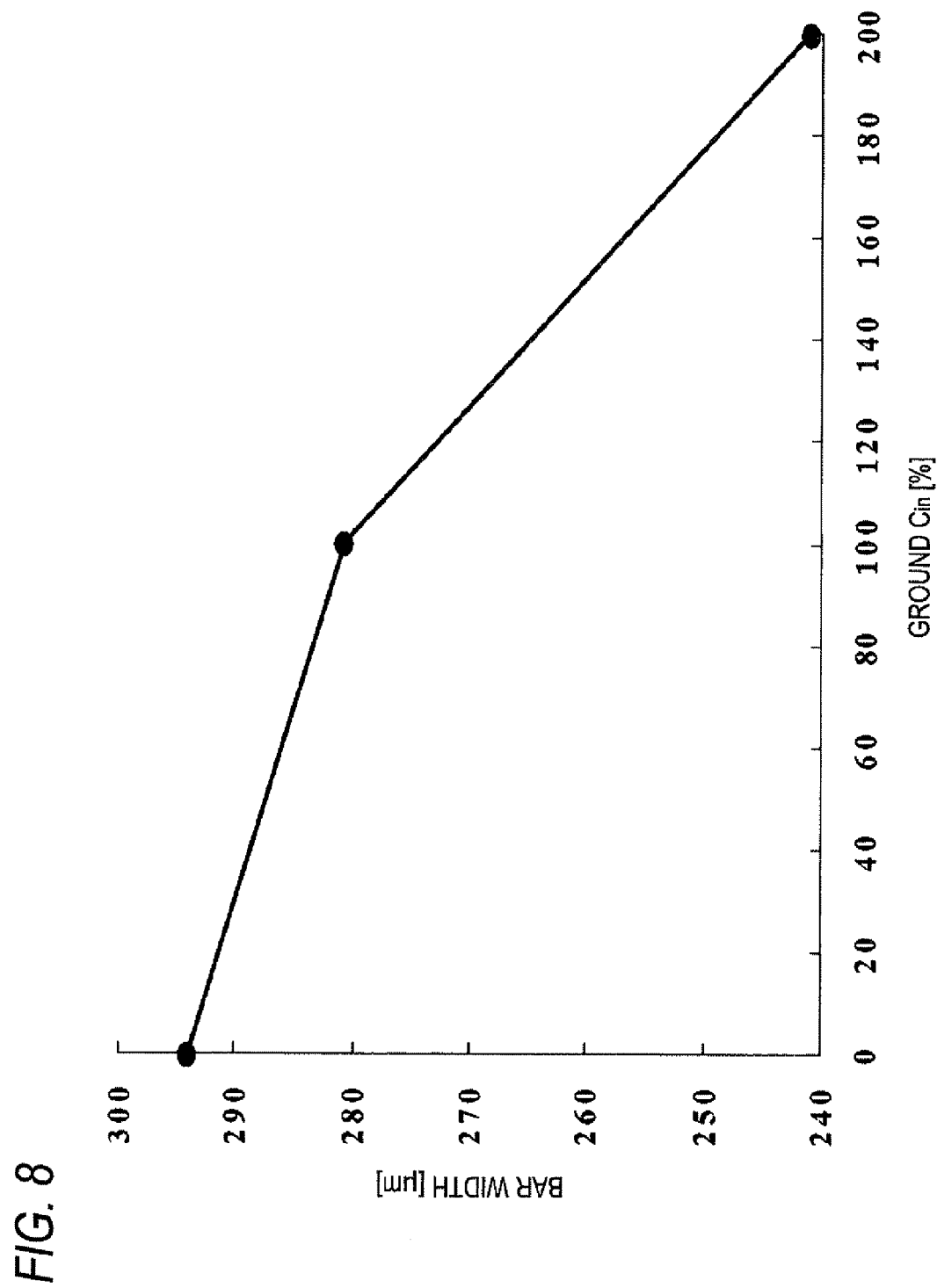
FIG. 8 is a view of a changing state of the width of a line image according to a change of coverage.

FIG. 8 shows relationships between the line width which is printed by using the printing color material for the information image, and the coverage which is ground-processed, and, similarly with the graph shown in FIG. 7, indicates that, as the rate of the coverage is larger, the line width of the printing color material is smaller.

In (c) and (d) of FIG. 6, the example in which two colors of yellow and magenta colors are used as printing color materials for performing the ground process is shown. The exemplary embodiment is not restricted to the example, and may be configured so that, as shown in (e) and (f) of FIG. 6, the ground process is performed while using only one color of a yellow color. It is a matter of course that the ground process may be performed while using a magenta color in place of a yellow color.

Figure 9A:
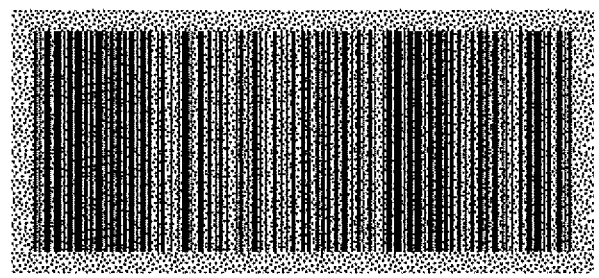
FIGS. 9A and 9B are views showing examples of code information in a state where the ground process is performed.

FIGS. 9A and 98 are views showing examples of code information in a state where such a ground process is performed on the code information of FIGS. 4A and 4B, and the print out is then conducted by the print outputting portion 107, respectively.

Figure 9B:
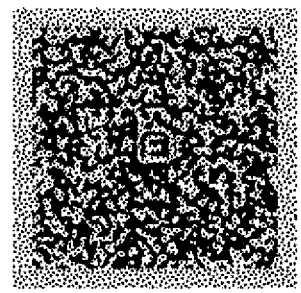

The examples of FIGS. 9A and 9B show a state where the ground process is performed on the periphery of the information image.

Namely, the examples show a state where, in the case where an information image is printed by using a black color, a ground process is performed while using yellow and magenta colors to which a code reader that is sensitive to the black color is not sensitive, whereby a ground tinged with red is printed in the vicinity of the information image. The ground tinged with red is shown by hatching with dots in FIGS. 9A and 9B.

In the above example, the case where the print outputting portion 107 print-outputs while using four colors of cyan, magenta, yellow, and black colors has been described. In the case where, in addition to these printing color materials, a printing color material (referred to also as "invisible printing color material") which is transparent in the visible range is to be mounted, or that where at least one printing color material of a black color and a transparent printing color material are to be mounted, a ground process may be performed while using the transparent printing color material.

Figure 10:
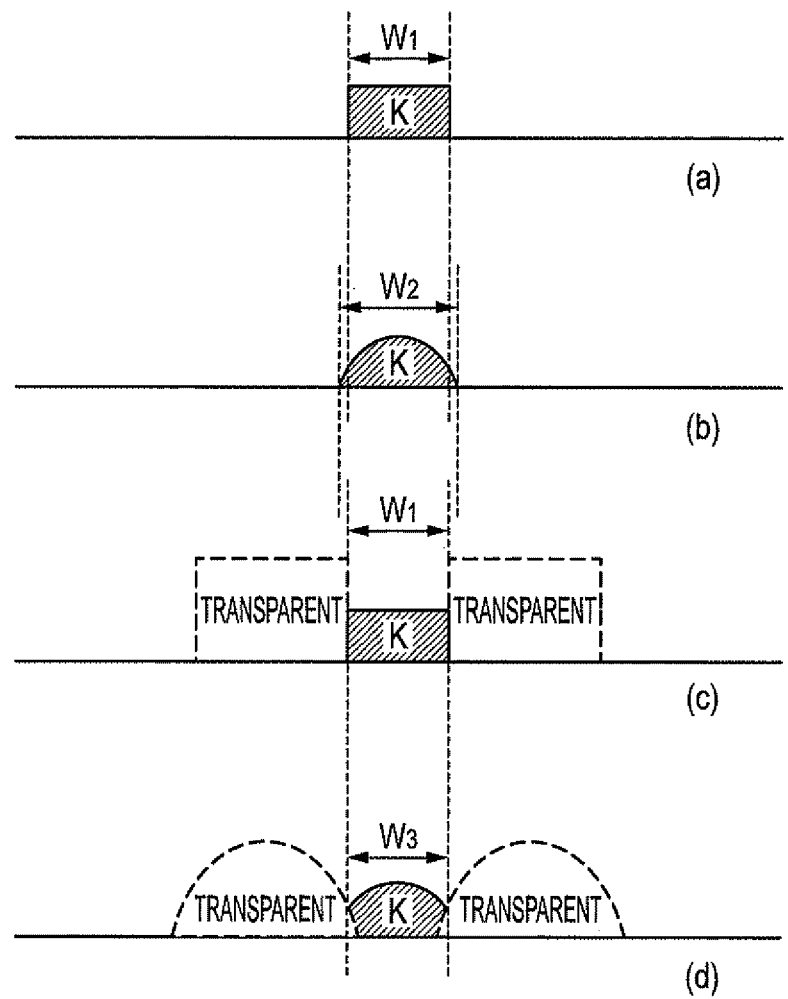
FIG. 10 is a view showing a state where a ground for an information image is printed by using a transparent color material.

FIG. 10 shows a state where a ground for an information image is printed by using the invisible printing color material.

The print state shown in FIG. 10 is a state where one color of a yellow color such as shown in (e) and (f) of FIG. 6 is used as a printing color material for the ground process, and a state which is similar to the state where the ground is printed, and in which a ground process is performed while using a transparent printing color material in place of the yellow printing color material is indicated, thereby setting a state where the ground is not visible.

Figure 2:
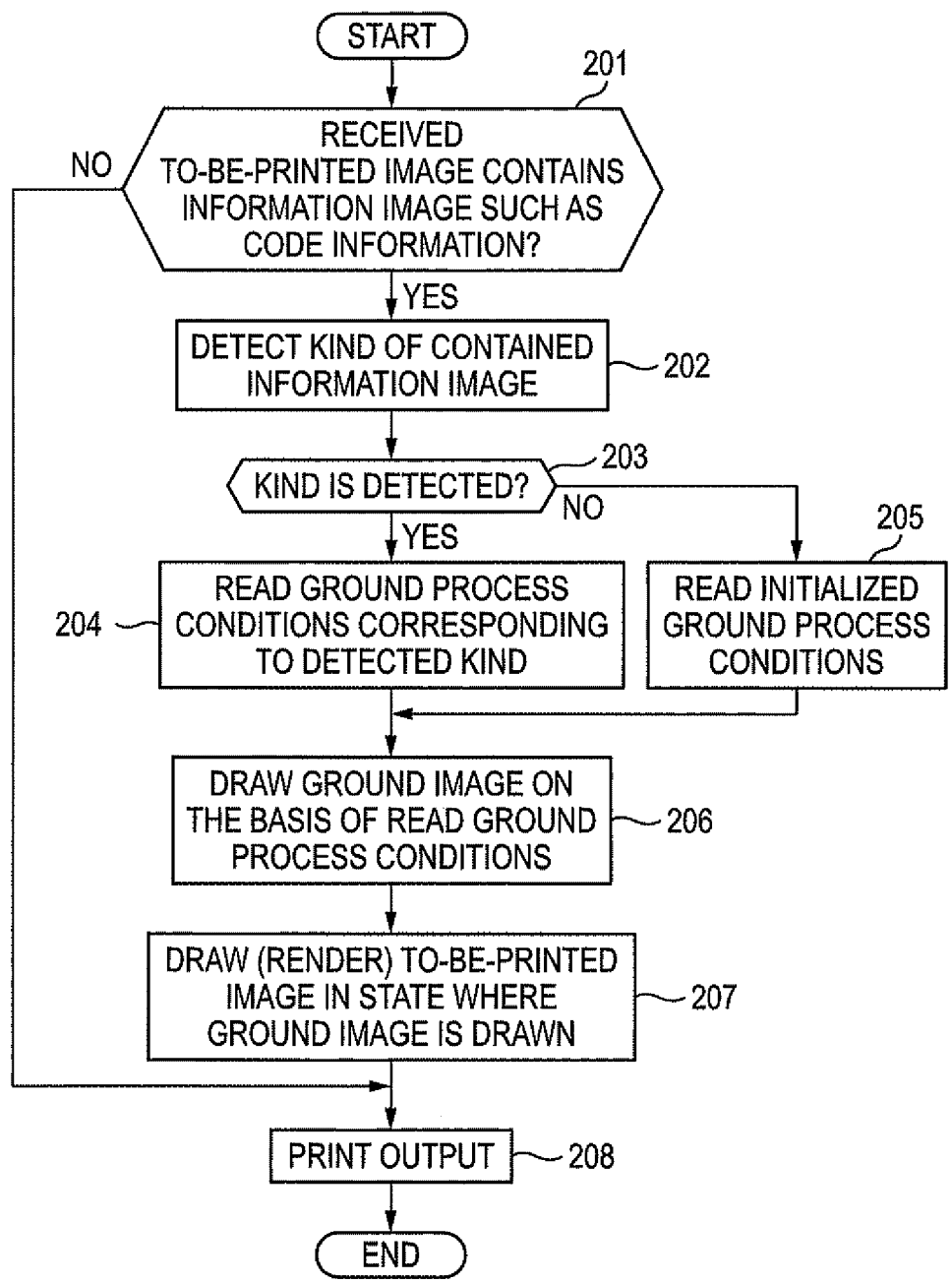
FIG. 2 is a flowchart showing the flow of a process which is performed in the image forming apparatus of the exemplary embodiment of the invention.

FIG. 2 is a flowchart showing the flow of a process which is performed in the image forming apparatus of the exemplary embodiment of the invention.

Referring to FIG. 2, when to-be-processed data are received, the process is started, the detecting process is performed to determine whether the received to-be-printed image contains code information configured by a bar code or a two-dimensional bar code or not (201).

If it is determined in the determining process that an information image indicative of code information is detected from the to-be-printed image (YES in 201), the kind of the detected information image indicative of code information is determined (202).

In the determining process, characteristic information characterizing each code information, and the detected information image are compared with each other. If they are coincident with each other, it is determined that the information corresponds to the characteristic information of the information image.

At this time, it is determined whether the kind of the information image can be determined or not (203). If the kind can be determined (YES in 203), the ground process conditions of the ground process which is to be performed on the code information of the detected kind are read (204). The case where the kind can be determined is that where, when a part of the to-be-printed image coincides with characteristic information, for example, it is determined that the part of the to-be-printed image is an information image.

By contrast, if the kind cannot be determined (NO in 203), initial ground process conditions which are preset are read (205).

When the ground process conditions are read in this way, the ground process is performed on the basis of the read ground process conditions, thereby drawing (producing) a ground image (206). Furthermore, the to-be-printed image containing the information image is drawn (rendered) on the drawn ground image (207).

Then, a print job in a state where the to-be-printed image is drawn on the ground image as described above is print-output (208).

The above-described exemplary embodiment is a mode of carrying out the invention, and, without limiting the invention to the embodiments, the invention may be properly modified without changing the spirit of the invention.

The invention may be configured so that the above-described processes are performed by carrying out the above-described operations in an image forming apparatus having a communication function, or by installing programs for configuring the above-described units from a recording medium (a CD-ROM, a DVD-ROM, or the like) storing the programs into a computer, and executing the programs.

In the computer, a CPU (Central Processor Unit), a ROM (Read Only Memory), a RAM (Random Access Memory), and a hard disk are connected to the computer through a system bus. In accordance with programs stored in the ROM or the hard disk, the CPU performs the processes while using the RAM as a work area.

Alternatively, a medium for supplying the programs may be a communication medium (a medium which holds programs temporarily or fluidly, such as a communication line or a communication system). For example, the programs may be provided on an electronic bulletin board (BBS: Bulletin Board Service) in a communication network, and distributed through a communication line.

The invention is not restricted to an image forming apparatus of the electrophotographic system, and may be applied also to an image forming apparatus of any image forming system such as a printer of the inkjet recording system, the thermal head system, or the lithography. Moreover, the invention is not restricted to a multicolor developing image forming apparatus, and may be applied also to a single color or so-called monochromatic image forming apparatus.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An image forming apparatus comprising:
a ground image producing unit which produces a ground image that determines a print position of an information image;
a ground image printing unit which prints the ground image produced by the ground image producing unit, with a printing color material which does not have a sensitivity in a reading wavelength of a reading apparatus that reads the information image; and
an information image printing unit which prints the information image at a print position that is determined by the ground image printed by the ground image printing unit,
wherein the ground image comprises a first set of dots,
the information image comprises a second set of dots,
the second set of dots are guided by the first set of dots so that the width of each dot of second set of dots is not larger than a determined dot width, and
each dot of the second set of dots is in contact with a plurality of dots of the first set of dots.

2. The image forming apparatus according to claim 1, wherein the apparatus further comprises a condition storing unit which stores ground process conditions that are set from at least a color material amount of each of at least one printing color material that is used in the information image, and a color material number of the at least one printing color material, and
the ground image producing unit produces the ground image on the basis of the ground process conditions which are stored in the condition storing unit.

3. The image forming apparatus according to claim 2, wherein the condition storing unit stores the ground process conditions for each kind of the information image.

4. The image forming apparatus according to claim 2, wherein the ground process conditions are determined by the color material amount and the color material number, and which are set from an exposure amount, charging potential and developing bias value in printing performed by the ground image printing unit and the information image printing unit.

5. The image forming apparatus according to claim 3, wherein the ground process conditions are determined by the color material amount and the color material number, and which are set from an exposure amount, charging potential and developing bias value in printing performed by the ground image printing unit and the information image printing unit.

6. The image forming apparatus according to claim 1, wherein the ground image printing unit prints the ground image with an invisible printing color material which does not have a sensitivity in a reading wavelength of the reading apparatus.

7. The image forming apparatus according to claim 2, wherein the ground image printing unit prints the ground image with an invisible printing color material which does not have a sensitivity in a reading wavelength of the reading apparatus.

8. The image forming apparatus according to claim 3, wherein the ground image printing unit prints the ground image with an invisible printing color material which does not have a sensitivity in a reading wavelength of the reading apparatus.

9. The image forming apparatus according to claim 4, wherein the ground image printing unit prints the ground image with an invisible printing color material which does not have a sensitivity in a reading wavelength of the reading apparatus.

10. The image forming apparatus according to claim 5, wherein the ground image printing unit prints the ground image with an invisible printing color material which does not have a sensitivity in a reading wavelength of the reading apparatus.

11. An image forming method comprising:
producing a ground image that determines a print position of an information image;
printing the ground image with a printing color material which does not have a sensitivity in a reading wavelength of a reading apparatus that reads the information image; and
printing the information image at the print position that is determined by the printed ground image,
wherein the ground image comprises a first set of dots,
the information image comprises a second set of dots,
the second set of dots are guided by the first set of dots so that the width of each dot of second set of dots is not larger than a determined dot width, and
each dot of the second set of dots is in contact with a plurality of dots of the first set of dots.

12. A non-transitory computer readable medium storing a program causing a computer to execute a process for forming an image, the process comprising:
producing a ground image that determines a print position of an information image;
printing the ground image with a printing color material which does not have a sensitivity in a reading wavelength of a reading apparatus that reads the information image; and
printing the information image at the print position that is determined by the printed ground image,
wherein the ground image comprises a first set of dots,
the information image comprises a second set of dots,
the second set of dots are guided by the first set of dots so that the width of each dot of second set of dots is not larger than a determined dot width, and
each dot of the second set of dots is in contact with a plurality of dots of the first set of dots.

13. The image forming apparatus according to claim 1, wherein a width of dots of the information image is determined based upon factors including an amount of the printing color material used by the ground image printing unit for printing the ground image, a position where the ground image is to be printed, a number of printing color materials to be used by the ground image printing unit for printing the ground image, and an order of superimposition of printing color material to be used by the ground image printing unit for printing the ground image.

14. The image forming apparatus according to claim 1, wherein the width of each dot of second set of dots is smaller than a determined dot width.

15. The image forming method according to claim 11, wherein the width of each dot of second set of dots is smaller than a determined dot width.

16. The non-transitory computer readable medium according to claim 12, wherein the width of each dot of second set of dots is smaller than a determined dot width.

* * * * *